United States Patent
Chane et al.

(10) Patent No.: US 8,365,230 B2
(45) Date of Patent: Jan. 29, 2013

(54) INTERACTIVE USER INTERFACE FOR TELEVISION APPLICATIONS

(75) Inventors: Lena D. Chane, San Francisco, CA (US); Matt Marenghi, San Francisco, CA (US); Ty Ahmad-Taylor, New York, NY (US); Alex Chung, San Francisco, CA (US); Prakash Hegde, Mill Valley, CA (US); Samuel Moreau, Mill Valley, CA (US); Darrel Haber, Martinez, CA (US)

(73) Assignee: TVWorks, LLC, Philadelphia, PA (US)

( * ) Notice: Subject to any disclaimer, the term of this patent is extended or adjusted under 35 U.S.C. 154(b) by 1259 days.

(21) Appl. No.: 10/247,901

(22) Filed: Sep. 19, 2002

(65) Prior Publication Data

US 2003/0084449 A1    May 1, 2003

Related U.S. Application Data

(60) Provisional application No. 60/323,658, filed on Sep. 19, 2001, provisional application No. 60/395,277, filed on Jul. 11, 2002.

(51) Int. Cl.
*G06F 3/00* (2006.01)
*G06F 13/00* (2006.01)
*H04N 5/445* (2011.01)

(52) U.S. Cl. .......... 725/59; 725/27; 725/28; 725/29; 725/30

(58) Field of Classification Search .......... 725/59, 725/27–40
See application file for complete search history.

(56) References Cited

U.S. PATENT DOCUMENTS

| 5,287,489 A |   | 2/1994 | Nimmo et al. |
|---|---|---|---|
| 5,321,750 A | * | 6/1994 | Nadan .......................... 380/230 |
| 5,485,221 A | * | 1/1996 | Banker et al. ................. 348/563 |
| 5,583,563 A |   | 12/1996 | Wanderscheid et al. |
| 5,592,551 A |   | 1/1997 | Lett et al. |
| 5,594,509 A |   | 1/1997 | Florin et al. |
| 5,613,057 A |   | 3/1997 | Caravel |
| 5,657,072 A |   | 8/1997 | Aristides et al. |
| 5,659,793 A |   | 8/1997 | Escobar et al. |
| 5,666,645 A |   | 9/1997 | Thomas |

(Continued)

FOREIGN PATENT DOCUMENTS

| EP | 0624039 A2 | 11/1994 |
|---|---|---|
| EP | 0624039 A3 | 11/1994 |

(Continued)

OTHER PUBLICATIONS

PCT International Search Report, International Application No. PCT/US02/29917, mailed Apr. 14, 2003 (8 pages).

(Continued)

*Primary Examiner* — Pankaj Kumar
*Assistant Examiner* — Charles N Hicks
(74) *Attorney, Agent, or Firm* — Banner & Witcoff, Ltd.

(57) ABSTRACT

An iTV user interface includes a navigable menu area through which a user can select from among a variety of services and a content display area in which formatted data associated with a selected menu service are displayed to the user. The formatted data is displayed in a rotating or ticker fashion having both a passive mode, in which the formatted data is displayed in a sequence independent of any selection operations by a television viewer, and active mode, in which the formatted data is displayed in a sequence that depends on selection operations by the television viewer. Advertisements and/or promotions may be interspersed among the content items. The navigable menu area and the content display area may be displayed to the viewer at the same time as television programming is displayed on the television.

38 Claims, 10 Drawing Sheets

U.S. PATENT DOCUMENTS

| | | | |
|---|---|---|---|
| 5,675,752 A | 10/1997 | Scott et al. | |
| 5,694,176 A | 12/1997 | Bruette | |
| 5,826,102 A | 10/1998 | Escobar | |
| 5,844,620 A | 12/1998 | Coleman | |
| 5,850,218 A | 12/1998 | LaJoie et al. | |
| 5,852,435 A | 12/1998 | Vigneaux | |
| 5,860,073 A | 1/1999 | Ferrel et al. | |
| 5,883,677 A | 3/1999 | Hofmann | |
| 5,892,902 A | 4/1999 | Clark | |
| 5,892,905 A | 4/1999 | Brandt | |
| 5,929,849 A | 7/1999 | Kikinis | |
| 5,990,890 A | 11/1999 | Etheredge | |
| 5,996,025 A | 11/1999 | Day et al. | |
| 6,002,394 A * | 12/1999 | Schein et al. | 725/39 |
| 6,005,561 A | 12/1999 | Hawkins et al. | |
| 6,008,803 A | 12/1999 | Rowe | |
| 6,008,836 A | 12/1999 | Bruck et al. | |
| 6,025,837 A | 2/2000 | Matthews, III et al. | |
| 6,049,823 A | 4/2000 | Hwang | |
| 6,067,108 A | 5/2000 | Yokote | |
| 6,088,722 A | 7/2000 | Herz et al. | |
| 6,141,003 A | 10/2000 | Chor et al. | |
| 6,148,081 A | 11/2000 | Szymanski | |
| 6,162,697 A | 12/2000 | Singh et al. | |
| 6,169,543 B1 | 1/2001 | Wehmeyer | |
| 6,172,677 B1 * | 1/2001 | Stautner et al. | 715/716 |
| 6,177,931 B1 | 1/2001 | Alexander et al. | |
| 6,191,781 B1 | 2/2001 | Chaney et al. | |
| 6,205,582 B1 | 3/2001 | Hoarty | |
| 6,219,839 B1 | 4/2001 | Sampsell | |
| 6,240,555 B1 | 5/2001 | Shoff | |
| 6,292,827 B1 | 9/2001 | Raz | |
| 6,314,569 B1 | 11/2001 | Chernock et al. | |
| 6,317,885 B1 | 11/2001 | Fries | |
| 6,345,305 B1 | 2/2002 | Beck et al. | |
| 6,405,239 B1 | 6/2002 | Addington et al. | |
| 6,415,438 B1 | 7/2002 | Balckketter | |
| 6,421,067 B1 | 7/2002 | Kamen | |
| 6,426,779 B1 | 7/2002 | Noguchi et al. | |
| 6,442,755 B1 | 8/2002 | Lemmons | |
| 6,477,705 B1 | 11/2002 | Yuen et al. | |
| 6,486,920 B2 | 11/2002 | Arai et al. | |
| 6,522,342 B1 | 2/2003 | Gagnon | |
| 6,529,950 B1 | 3/2003 | Lumelsky et al. | |
| 6,532,589 B1 | 3/2003 | Proehl et al. | |
| 6,564,263 B1 | 5/2003 | Bergman et al. | |
| 6,571,392 B1 | 5/2003 | Zigmond | |
| 6,591,292 B1 | 7/2003 | Morrison et al. | |
| 6,678,891 B1 | 1/2004 | Wilcox et al. | |
| 6,684,400 B1 | 1/2004 | Goode et al. | |
| 6,760,043 B2 | 7/2004 | Markel | |
| 6,763,522 B1 * | 7/2004 | Kondo et al. | 725/39 |
| 6,766,526 B1 | 7/2004 | Ellis | |
| 6,806,887 B2 | 10/2004 | Chernock et al. | |
| 6,910,191 B2 | 6/2005 | Segerberg et al. | |
| 7,028,327 B1 | 4/2006 | Dougherty et al. | |
| 7,065,785 B1 | 6/2006 | Shaffer et al. | |
| 7,103,904 B1 | 9/2006 | Blackketter et al. | |
| 7,114,170 B2 | 9/2006 | Harris | |
| 7,152,236 B1 | 12/2006 | Wugofski et al. | |
| 7,162,694 B2 | 1/2007 | Venolia | |
| 7,162,697 B2 | 1/2007 | Markel | |
| 7,197,715 B1 | 3/2007 | Valeria | |
| 7,207,057 B1 | 4/2007 | Rowe | |
| 7,213,005 B2 | 5/2007 | Mourad et al. | |
| 7,221,801 B2 | 5/2007 | Jang et al. | |
| 7,305,696 B2 * | 12/2007 | Thomas et al. | 725/114 |
| 7,337,457 B2 * | 2/2008 | Pack et al. | 725/40 |
| 7,360,232 B2 * | 4/2008 | Mitchell | 725/112 |
| 7,363,612 B2 | 4/2008 | Satuloori | |
| 7,440,967 B2 | 10/2008 | Chidlovskii | |
| 7,464,344 B1 | 12/2008 | Carmichael et al. | |
| 7,516,468 B1 | 4/2009 | Deller | |
| 7,587,415 B2 | 9/2009 | Gaurav et al. | |
| 7,640,487 B2 | 12/2009 | Amielh-Caprioglio et al. | |
| 7,703,116 B1 | 4/2010 | Moreau et al. | |
| 7,721,307 B2 | 5/2010 | Hendricks et al. | |
| 7,743,330 B1 | 6/2010 | Hendricks et al. | |
| 2001/0014206 A1 | 8/2001 | Artigalas et al. | |
| 2001/0056573 A1 | 12/2001 | Kovac | |
| 2001/0056577 A1 | 12/2001 | Gordon et al. | |
| 2002/0010928 A1 | 1/2002 | Sahota | |
| 2002/0016969 A1 | 2/2002 | Kimble | |
| 2002/0023270 A1 * | 2/2002 | Thomas et al. | 725/95 |
| 2002/0041267 A1 | 4/2002 | Graf et al. | |
| 2002/0042915 A1 | 4/2002 | Kubischta et al. | |
| 2002/0059586 A1 | 5/2002 | Carney et al. | |
| 2002/0059629 A1 | 5/2002 | Markel | |
| 2002/0078444 A1 | 6/2002 | Krewin et al. | |
| 2002/0083450 A1 | 6/2002 | Kamen et al. | |
| 2002/0100041 A1 | 7/2002 | Rosenberg | |
| 2002/0108122 A1 | 8/2002 | Alao et al. | |
| 2002/0124254 A1 | 9/2002 | Kikinis | |
| 2002/0144269 A1 | 10/2002 | Connelly | |
| 2002/0144273 A1 | 10/2002 | Reto | |
| 2002/0147645 A1 | 10/2002 | Alao et al. | |
| 2002/0152477 A1 | 10/2002 | Goodman et al. | |
| 2002/0156839 A1 | 10/2002 | Peterson et al. | |
| 2002/0169885 A1 | 11/2002 | Alao et al. | |
| 2002/0170059 A1 | 11/2002 | Hoang | |
| 2002/0171691 A1 * | 11/2002 | Currans et al. | 345/864 |
| 2002/0184629 A1 | 12/2002 | Sie et al. | |
| 2002/0196268 A1 | 12/2002 | Wolff et al. | |
| 2002/0199190 A1 | 12/2002 | Su | |
| 2003/0001880 A1 | 1/2003 | Holtz et al. | |
| 2003/0014752 A1 | 1/2003 | Zaslavsky et al. | |
| 2003/0014753 A1 | 1/2003 | Beach et al. | |
| 2003/0023970 A1 | 1/2003 | Panabaker | |
| 2003/0025832 A1 * | 2/2003 | Swart et al. | 348/461 |
| 2003/0028873 A1 | 2/2003 | Lemmons | |
| 2003/0041104 A1 | 2/2003 | Wingard et al. | |
| 2003/0051246 A1 | 3/2003 | Wilder et al. | |
| 2003/0056216 A1 | 3/2003 | Wugofski et al. | |
| 2003/0056218 A1 | 3/2003 | Wingard | |
| 2003/0066081 A1 | 4/2003 | Barone, Jr. et al. | |
| 2003/0067554 A1 | 4/2003 | Klarfeld | |
| 2003/0070170 A1 | 4/2003 | Lennon | |
| 2003/0084444 A1 * | 5/2003 | Ullman et al. | 725/40 |
| 2003/0084449 A1 | 5/2003 | Chane et al. | |
| 2003/0086694 A1 | 5/2003 | Davidsson | |
| 2003/0093790 A1 * | 5/2003 | Logan et al. | 725/38 |
| 2003/0093792 A1 * | 5/2003 | Labeeb et al. | 725/46 |
| 2003/0097657 A1 | 5/2003 | Zhou et al. | |
| 2003/0110503 A1 | 6/2003 | Perkes | |
| 2003/0126601 A1 | 7/2003 | Roberts | |
| 2003/0132971 A1 | 7/2003 | Billmaier et al. | |
| 2003/0135464 A1 | 7/2003 | Mourad et al. | |
| 2003/0140097 A1 | 7/2003 | Schloer | |
| 2003/0151621 A1 | 8/2003 | McEvilly et al. | |
| 2003/0172370 A1 | 9/2003 | Satuloori et al. | |
| 2003/0189668 A1 | 10/2003 | Newnam et al. | |
| 2003/0204846 A1 | 10/2003 | Breen | |
| 2003/0204854 A1 | 10/2003 | Blackketter et al. | |
| 2003/0229899 A1 | 12/2003 | Thompson et al. | |
| 2004/0003402 A1 | 1/2004 | McKenna | |
| 2004/0019900 A1 | 1/2004 | Knightbridge | |
| 2004/0039754 A1 | 2/2004 | Harple | |
| 2004/0107437 A1 | 6/2004 | Reichardt et al. | |
| 2004/0133923 A1 | 7/2004 | Watson et al. | |
| 2004/0136698 A1 | 7/2004 | Mock | |
| 2004/0172648 A1 | 9/2004 | Xu et al. | |
| 2004/0221306 A1 | 11/2004 | Noh | |
| 2004/0226051 A1 | 11/2004 | Carney et al. | |
| 2005/0005288 A1 | 1/2005 | Novak | |
| 2005/0149972 A1 | 7/2005 | Knudson | |
| 2005/0155063 A1 | 7/2005 | Bayrakeri et al. | |
| 2005/0283800 A1 | 12/2005 | Ellis | |
| 2005/0287948 A1 | 12/2005 | Hellwagner et al. | |
| 2006/0080707 A1 * | 4/2006 | Laksono | 725/38 |
| 2007/0271587 A1 | 11/2007 | Rowe | |
| 2008/0060011 A1 * | 3/2008 | Kelts | 725/39 |
| 2008/0235725 A1 | 9/2008 | Hendricks | |
| 2008/0276278 A1 | 11/2008 | Krieger et al. | |
| 2009/0094632 A1 | 4/2009 | Newnam | |
| 2010/0223640 A1 | 9/2010 | Reichardt | |
| 2010/0251284 A1 | 9/2010 | Ellis | |
| 2011/0209180 A1 | 8/2011 | Ellis et al. | |

FOREIGN PATENT DOCUMENTS

| | | |
|---|---|---|
| EP | 0963115 | 12/1999 |
| EP | 1080582 B1 | 3/2001 |
| EP | 1058999 | 4/2003 |
| WO | 99/63757 | 12/1999 |
| WO | 0011869 | 3/2000 |
| WO | 00/33576 | 6/2000 |
| WO | 0182613 | 11/2001 |
| WO | 02063426 | 8/2002 |
| WO | 02063471 | 8/2002 |
| WO | 02063851 | 8/2002 |
| WO | 02063878 | 8/2002 |
| WO | 03/009126 | 1/2003 |

OTHER PUBLICATIONS

Non-Final Office Action in U.S. Appl. No. 10/618,210, mailed Jan. 21, 2010.
Sylvain Devillers, "Bitstream Syntax Definition Language: an Input to MPEG-21 Content Representation," Mar. 2001, ISO, ISO/IEC JTC1/SC29/WG11 MPEG01/M7053.
Fernando Periera, "The MPEG-4 Book," Prentice Hall, Jul. 10, 2002.
Michael Adams, "Open Cable Architecture," Cisco Press, Dec. 3, 1999.
Mark Riehl, "XML and Perl," Sams, Oct. 16, 2002.
Office Action in U.S. Appl. No. 10/618,210, dated Jun. 28, 2010.
Office Action in U.S. Appl. No. 11/381,508, dated Mar. 16, 2010.
Office Action in U.S. Appl. No. 10/390,064, dated Apr. 12, 2010.
Office Action in U.S. Appl. No. 10/630,815, dated Apr. 13, 2010.
Office Action in U.S. Appl. No. 10/672,983, dated Jul. 20, 2010.
Office Action in U.S. Appl. No. 10/894,740, dated Oct. 14, 2010.
Office Action in U.S. Appl. No. 10/390,064, dated Nov. 8, 2010.
Office Action in U.S. Appl. No. 10/618,210, dated Jan. 25, 2011.
Office Action in U.S. Appl. No. 10/894,740, dated Mar. 10, 2011.
Office Action in U.S. Appl. No. 10/672,983, dated Mar. 30, 2011.
Office Action in U.S. Appl. No. 10/630,815, dated Apr. 21, 2011.
Andreas Kraft and Klaus Hofrichter, "An Approach for Script-Based Broadcast Application Production", Springer-Verlag Brling Heidelberg, pp. 74-82, 1999.
Office Action in U.S. Appl. No. 10/630,815 dated Jul. 9, 2008.
Office Action in U.S. Appl. No. 10/390,064 dated Jan. 25, 2008.
Office Action in U.S. Appl. No. 10/390,064 dated Sep. 4, 2008.
Office Action in U.S. Appl. No. 10/390,064 dated Oct. 27, 2009.
Office Action in U.S. Appl. No. 10/390,064 dated May 13, 2009.
Office Action in U.S. Appl. No. 10/618,210 dated Nov. 21, 2008.
Office Action in U.S. Appl. No. 10/618,210 dated Jun. 8, 2009.
Office Action in U.S. Appl. No. 10/618,210 dated Jun. 6, 2008.
Office Action in U.S. Appl. No. 10/672,983 dated Dec. 8, 2009.
Office Action in U.S. Appl. No. 10/672,983 dated Jan. 13, 2009.
Office Action in U.S. Appl. No. 10/672,983 dated Jun. 12, 2008.
Office Action in U.S. Appl. No. 10/672,983 dated Jun. 29, 2009.
Office Action in U.S. Appl. No. 10/630,815 dated Oct. 5, 2009.
Office Action in U.S. Appl. No. 10/630,815 dated Dec. 24, 2008.
Office Action in U.S. Appl. No. 10/630,815 dated Nov. 28, 2007.
Office Action in U.S. Appl. No. 10/933,845 dated Jun. 23, 2010.
Office Action in U.S. Appl. No. 10/933,845 dated Nov. 24, 2009.
Office Action in U.S. Appl. No. 10/933,845 dated Dec. 13, 2007.
Office Action in U.S. Appl. No. 10/933,845 dated Jul. 9, 2008.
Office Action in U.S. Appl. No. 10/672,983 dated Mar. 30, 2011.
Office Action in U.S. Appl. No. 10/618,210, dated Oct. 4, 2007.
Office Action in U.S. Appl. No. 10/933,845 dated Oct. 19, 2011.
Office Action in U.S. Appl. No. 10/672,983 dated Oct. 25, 2011.
Office Action in U.S. Appl. No. 12/730,771 dated Oct. 5, 2010.
Yoon, et al., "Video Gadget: MPET-7 Based Audio-Visual Content Indexing and Browsing Engine", LG Electronics Institute of Technology, pp. 59-68.
U.S. Appl. No. 10/460,950, filed Jun. 12, 2003.
Office Action in U.S. Appl. No. 10/925,737 dated Feb. 9, 2011.
Office Action in U.S. Appl. No. 09/841,149 dated Nov. 8, 2010.
Office Action in U.S. Appl. No. 10/630,815 dated Apr. 21, 2011.
Office Action in U.S. Appl. No. 10/933,845, dated Jul. 6, 2011.
Office Action in U.S. Appl. No. 10/894,740, dated Jul. 7, 2011.
Office Action in U.S. Appl. No. 10/618,210, dated Jul. 11, 2011.

* cited by examiner

INTERACTIVE USER INTERFACE FOR TELEVISION APPLICATIONS

RELATED APPLICATIONS

The present application is related to, incorporates by reference and hereby claims the priority benefit of:
a. U.S. Provisional Patent Application No. 60/323,658, entitled "Interactive User Interface for Television Applications", filed Sep. 19, 2001 and assigned to the assignee of the present invention.
b. U.S. Provisional Patent Application No. 60/395,277, entitled "Programming Contextual Interactive User Interface for Television", filed Jul. 11, 2002 and assigned to the assignee of the present invention.

FIELD OF THE INVENTION

The present invention relates to a user interface for use with video systems, and in particular interactive television (iTV) systems, that provides for both information display and navigation.

BACKGROUND

In the past few years, home entertainment has evolved from purely one-way radio and television (TV) broadcasts to include two-way communication that encompasses interactive games, video on demand (VOD), educational fare and consumer-oriented services (e.g., interactive shopping). For the most part, these services have been offered through familiar cable and satellite television distribution systems.

Broadly speaking, there are two paradigms for using cable and satellite systems in this fashion. One is computer-centric: using an installed satellite or cable feed (perhaps with a cable or telephone network back channel) as a high-bandwidth conduit to bring online computing services, such as Internet access, into the home. The second is television-centric: adding interactive functions to TV programming.

In general, systems deployed using the television-centric model have been grouped under the label interactive television or iTV. iTV services are usually delivered to subscribers' homes through an existing cable system, along with other, free and pay-for content. One example of available iTV services is a series of interactive TV portal screens, collectively called a "walled garden". A walled garden is a collection of user content targeted toward a specific viewing audience. Delivered to the television via a local decoder system (sometimes called a set-top box), viewers navigate the walled garden using a remote control, exploring and interacting with offerings such as banking services, news, sports, weather, entertainment, and shopping. Network operators typically gain revenue from walled gardens by taking a percentage of the transactions or charging for space in TV malls. Walled gardens extend the network operator's brand identity while maintaining the well-known names that provide the content. Thus, the service provider can create a cohesive set of up-to-date content to provide viewers with a rich interactive experience through their television set. These walled garden services can be enhanced through the provision of on-demand video services being made available related to the walled garden content. In this manner various special interest 'virtual' channels that include on-demand video services, such as home and garden, travel, history, geography, sports, educational and news channels can be made available to the home viewer.

As indicated above, accessing iTV services sometimes requires the installation of a special decoder system (a set-top box) that may include a dedicated remote control unit. Other systems incorporate the iTV decoder system in a set-top box that is also used to decode and/or decrypt the television signals. In either case, the set-top box and its associated remote control provide an interface for the user to access the iTV services, usually through some form of on-screen menu that is displayed in response to user command inputs. The on-screen menu may or may not be overlaid on top of the television picture. Common examples of on-screen menus include audio/video program guides, electronic catalogs, and advertising information.

Clearly, an important component of any walled garden or other iTV service is the interactivity provided through the combination of the set-top box and its remote control and the on-screen menu. Collectively, the set-top box, the remote control and the visual information display make up the user interface for the iTV services. To date, however, these user interfaces have not been satisfactory.

SUMMARY OF THE INVENTION

The present invention relates to user interfaces for interactive television (iTV) and other applications, which in one embodiment serves as an information presentation architecture for enabling users of iTV services to access a range of broadcast, on-demand programming and other content (which may or may not be related to a current broadcast and/or channel context of the television viewer), offered through an iTV network and made available via applications that may execute on a receiver such as a set-top box. The interactive user interface can be displayed at the same time as television programming, either as an overlay to television programming or with the television programming displayed in a scaled window.

In one embodiment, the present invention provides a content collection, distribution and display system that includes a server component configured to capture content for display to a television viewer by harvesting data from multiple data sources according to content collection rules specified in a configuration file that identifies locations from which the content can be harvested, and to produce a set of data files that include the harvested data, business rules and display rules for such data. The system also includes a distribution component coupled to receive the data files produced by the server component and to transmit the data files to a receiver utilizing a transmission channel (e.g., an in-band or out-of-band component of a satellite and/or cable television distribution network). Finally, the system includes a client component configured to receive the data files via the transmission channel and to populate a user interface, displayable to the television viewer simultaneously with other television programming via the receiver, with the harvested data as formatted data subject to the business rules and display rules.

The user interface may include a navigable menu area through which a user can select from among a variety of interactive television services. That is, the menu area provides access to a variety of services (e.g., video on demand services, game services, television programming related content services, managed content services, special interest services, self-provisioning services, chat services, email services, and television programming guide services) into which the content can be categorized. The user interface may also include a content display area in which those portions of the formatted data associated with a selected menu service are displayed to the television viewer. In some cases, this content is displayed in a rotating or ticker fashion (having both a passive mode, in which the formatted data is displayed in a sequence independent of any selection operations by a television viewer, and active mode, in which the formatted data is displayed in a sequence that depends on selection operations by the television viewer), with advertisements and/or promotions interspersed among the content items. In this way individual content items are displayed for configurable periods of time and then automatically replaced with new content items. The navigable menu area and the content display area may be displayed to the viewer at the same time as television programming is displayed on the television.

Within the user interface display, the displayed categories (e.g., news, weather, sports, entertainment, travel, special interest, demographic, world, national, regional, channel and program information, and local information) and services may change dynamically as new services are introduced and/or new business rules are defined by a network operator. The user interface may also include a content user interface component (referred to below as a content bar) that displays designated content (e.g., date/time/temperature information) regardless of what information is displayed in the content display area. Some embodiments of the present invention also provide for the display of communication alerts (such as e-mail alerts) via the user interface.

The content pieces, advertising and promotions may be organized and/or delivered according to configurable business rules defining content distribution across an iTV network. In this way, the content pieces, advertising and promotions, and preferred placement of elements of content, including tiles, within displayed categories may be dynamically controlled. The advertisements and/or promotions may be linked to services within the iTV network, and/or to an interactive capability to self-provision a related service. The business rules may be configured according to time of day, television channel, channel content, preferred placement, viewer demographic, viewer behavior, navigation context, and/or content category.

BRIEF DESCRIPTION OF THE DRAWINGS

The present invention is illustrated by way of example, and not limitation, in the figures of the accompanying drawings in which.

DETAILED DESCRIPTION

Described herein is a user interface for iTV applications. The present user interface may be embodied as a television application that provides navigation, information and communication services together, over full-screen television or embedded/scaled television programming. The application serves as a user interface to iTV services (e.g., walled garden services) and content and may be accessed through operation of a remote control device or other operator controls of a set-top box. In one embodiment, the remote control device may have a dedicated input mechanism (e.g., a physical or virtual button or a programmable set of keystrokes, etc.) to allow for rapid access to the on-screen menu portion of the user interface. The present application interface uniquely combines information and navigation features. For example, a subset of offered services and content may be provided directly through an on-screen or other menu and links may be provided to allow the user access to expanded information and services in the context defined by the subset.

As indicated, the on-screen menu may be presented as an overlay over full-screen broadcast television. In other cases, the menu may be presented as part of a special screen (e.g., allowing for scaled television video presentation) or as a separate picture-in-picture. Regardless of the format of presentation, the menu acts as a user interface to provide access to network operator services (e.g., iTV and/or MSO services), timely pieces of information, promotional or advertising material, and in some cases will still allow a user to view regular television programming while the menu is being displayed.

Figure 1A:
FIGS. 1A and 1B illustrate examples of on-screen menu and ticker portions of user interfaces for iTV services configured in accordance with embodiments of the present invention.
Figure 1B:
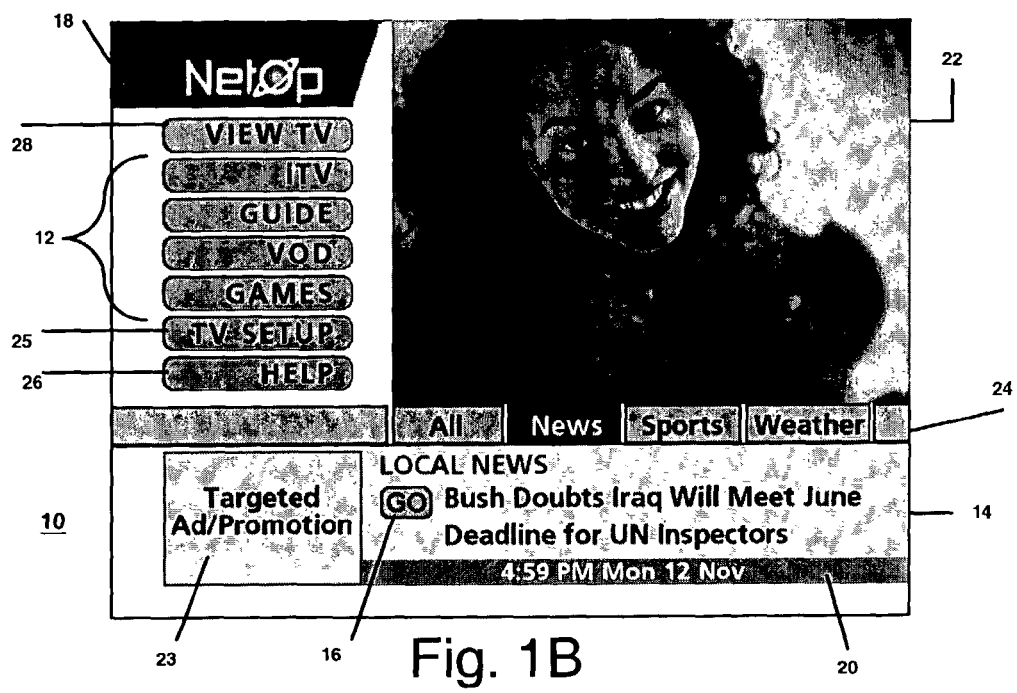

FIGS. 1A and 1B illustrate examples of user interfaces configured in accordance with the present invention. The user interfaces depicted in these examples include an overlay menu referred to as a TV Assistant 10. In other embodiments, TV Assistant 10 is displayed together with a scaled version of the television program video. As indicated above, the TV Assistant 10 may appear on a television screen (not shown in detail in this view) whenever a user inputs an appropriate command sequence using an associated remote control unit. In one embodiment, the appearance/disappearance of the TV Assistant 10 is associated with user commands applied through a MENU button (or some other designated button or command input device) of a TV or set-top box remote control while watching television.

As shown in the illustration, key pieces of information (e.g., weather information, news headlines, sports scores, stock quotes, etc.) are displayed through TV Assistant 10. Components of TV Assistant 10 include a main menu 12, which serves as the main menu to various interactive services (e.g., walled garden content, VOD, games, etc.); and an information content area 14, which displays updated content pieces including but not limited to news headlines, sports scores, stock information, etc.

TV Assistant 10 can also provide access to extended content. That is, additional information related to the content pieces displayed in content area 14 can be seamlessly accessed by allowing the user to navigate from the TV Assistant 10 to any other iTV service including but not limited to walled gardens/portal application (e.g., retrieving the full story for a headline that appears in the TV Assistant's content area 14 can be accomplished by selecting an appropriate link using the remote control). Such access may be provided through a navigation feature such as "GO" button 16 or other graphical element.

Network operator branding may be provided through a graphical element 18. Alternatively or in addition, content provider branding may be provided in a similar fashion. Further, a Time/Date/Current Temperature display may be incorporated in a content bar 20. Navigation items that provide an exit back to regular television programming and/or to further information or assistance (Help) may also be provided as separate selection elements or as part of the content bar 20. Preferably, content and other items displayed in the content bar 20 are invariant with respect to the content displayed in the information content area 14. As shown, the TV Assistant 10 occupies only a portion of the total available television screen, leaving room for the regular television picture 22 to be displayed for user enjoyment.

In addition to these features, other information or services may be displayed/accessed through TV Assistant 10. For example, basic advertising through interstitial or persistent advertisements can be made available. Advanced advertising providing a receptacle 23 for targeted ads can also be accommodated, as shown in FIG. 1B. Communication services such as instant messaging or chat capabilities can be accessed through appropriate menu options and, of course, the TV Assistant 10 can be customized (e.g., through a set-up option 25) for particular content display. For example, the TV Assistant 10 provides a service operator and/or a user with the ability to customize the content types that populate the TV Assistant's content area 14 and/or lower content bar 20, such as selected stock quotes, weather forecasts for specific cities, etc.

In addition, alerts may be set, providing the ability to notify a user of incoming mail (e.g., e-mail or instant messages) or pre-selected content alerts such as stock price targets, etc. The TV Assistant 10 also provides a vehicle for promotions: That is, a network operator has the opportunity to promote various services, offers, etc., through this interface. Self-provisioning is also provided for through an interface for adding interactive services or programming packages.

Broadcast partner integration that is context sensitive to the broadcast channel to which the television is tuned provides the ability for the TV Assistant 10 to be populated by content that is specific to the currently tuned broadcast TV channel. The TV Assistant 10 also provides an interface for commerce services, allowing uses the ability to complete simple transactions. Of course, the TV Assistant 10 also acts as an interface for displaying program specific information synchronized to the broadcast TV program.

The menu choices on both the main menu 12 and ticker menu 24 may be configured subject to service provider requirements and the following is only intended to illustrate one possible implementation. In the example shown, the Interactive option (labeled ITV) provides access to the walled garden home (e.g., a Web Browser). The Games option provides access to various interactive games services. The Guide option provides access to an Electronic Program Guide and the VOD option launches video on demand service.

As indicated above, the Help button 26 provides access to a Help page in the walled garden. The Back to TV option 28 allows a user to exit from the TV Assistant 10 to full screen TV viewing. The lower content bar 20 may display Date/Time/Current Temperature, and in one embodiment the time is updated every 5 seconds at the same time a new ticker item is displayed in content area 14.

The ticker menu 24 acts to highlight the information provided in content area 14. That is, the ticker menu 24 provides a quick visual indication of the type of content currently being accessed/displayed. The ticker rotates through content items within the designated menu categories every 5 seconds (or other predetermined time period). For example, when accessing sports content, the ticker may cause new scores from different sporting events to be displayed in the content area 14 every 5 seconds. By default the ticker component always begins by cycling through the News items (or other user programmed menu selection) and then moves on to the other menu options.

If the user does not select any of the items in the ticker menu 24 he/she remains in what is referred to as "passive" ticker mode. In the passive ticker mode, the ticker cycles through all of the News items first, displaying associated content in content area 14, then automatically moves to the next category when all (or a subset of the) current News items have been displayed. The ticker continues in this fashion, cycling through all (or a network operator defined subset) of the content items in each ticker category until all categories have been exhausted and then repeats the procedure. The currently selected ticker category may be graphically represented with a background color matching the background color of the ticker menu 24. Therefore, when the ticker automatically changes from News to Local, the background color of the navigation button (shown as a highlighted portion of the ticker menu 24) changes automatically to reflect this category change.

In addition to the passive mode, TV Assistant 10 also provides an "active" ticker mode. The user has the option of selecting any of the ticker menu items using the remote control and entering active ticker mode. At that point, the user is presented with the ticker content for the selected category (e.g., the user may be presented with local news items or community messages when he/she selects the Local ticker category) and these content items will continue to repeat within content area 14 (e.g., changing every 5 seconds or other predetermined time period) until the user selects another ticker menu category. The active ticker category navigation button may be graphically represented with a background color matching the background color of the ticker. Additionally, the navigation button is also complemented with a graphic icon (a diamond in this example) to indicate that the user is in the active ticker state.

Text or graphic based ads/promotions can be presented in an interstitial type display as content rotates through the TV Assistant's content area 14. One display point for text-based promotions would be as an additional content ticker item in-between category changes when in passive ticker mode. In active mode, a promotion could appear as the first or last (or other) ticker item in the rotation.

When selected, the GO button 16 will link the user to the appropriate page in the walled garden that corresponds to the current content item displayed in the content area 14. For example, selecting "GO" while a news headline is being displayed will take the user to the story page for that headline in the walled garden. Of course, other selection mechanisms may be used.

The various buttons and other graphical items in this interface may change color to reflect state. For example:

a. Unselected: White text on top of a background color.

b. Selected: White text on top of a different background color which matches the color of the ticker content area 14, thus drawing a visual connection between the category button and the ticker contents.

c. Selection Focus: White text on top of a unique background color representing the element with current focus. The user will be able to navigate to any selectable element. This may be represented by the background color of the element changing from the "unselected" background color to the "selection focus" color upon key press.

Figure 2:
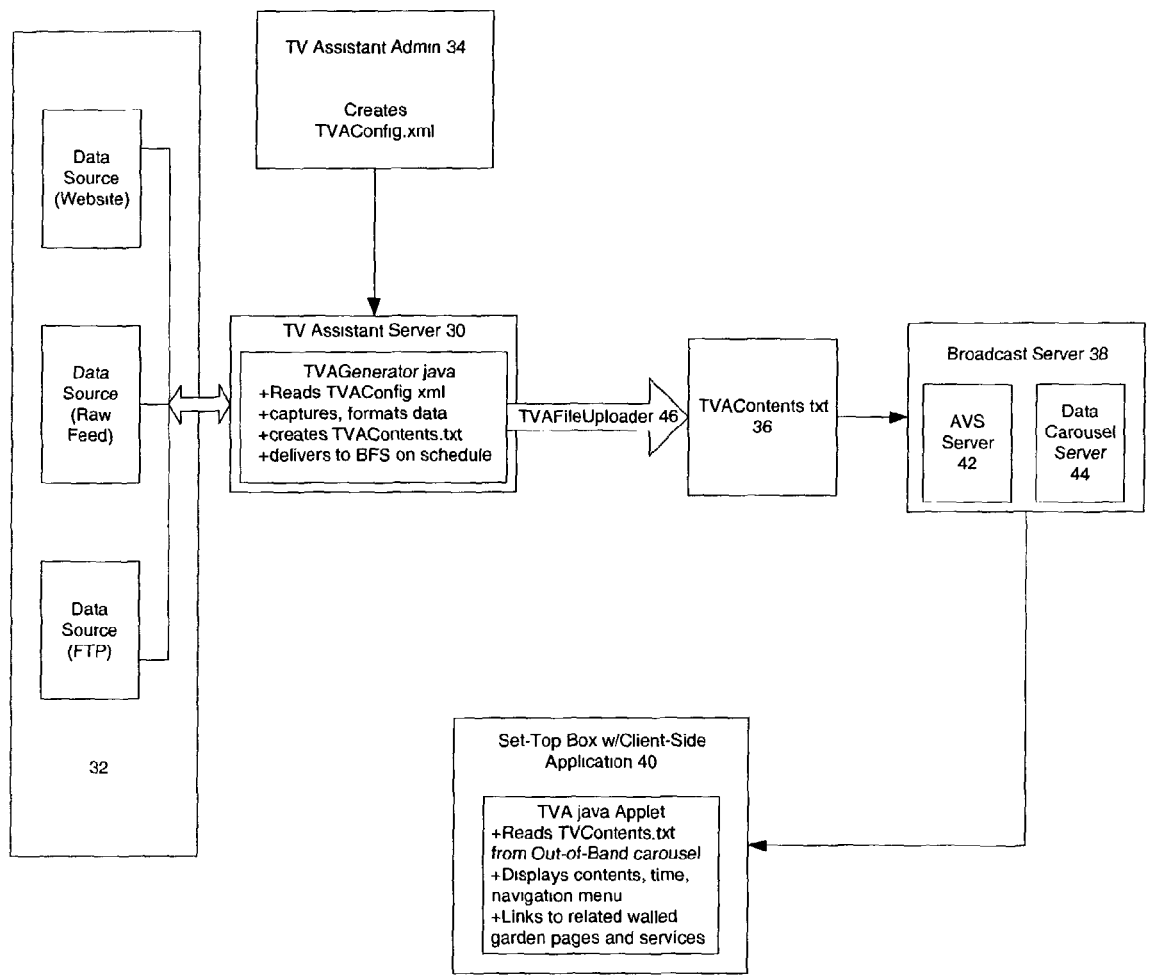
FIG. 2 illustrates one example of a content collection, distribution and display system having server and client components configured in accordance with an embodiment of the present invention.
Figure 3:
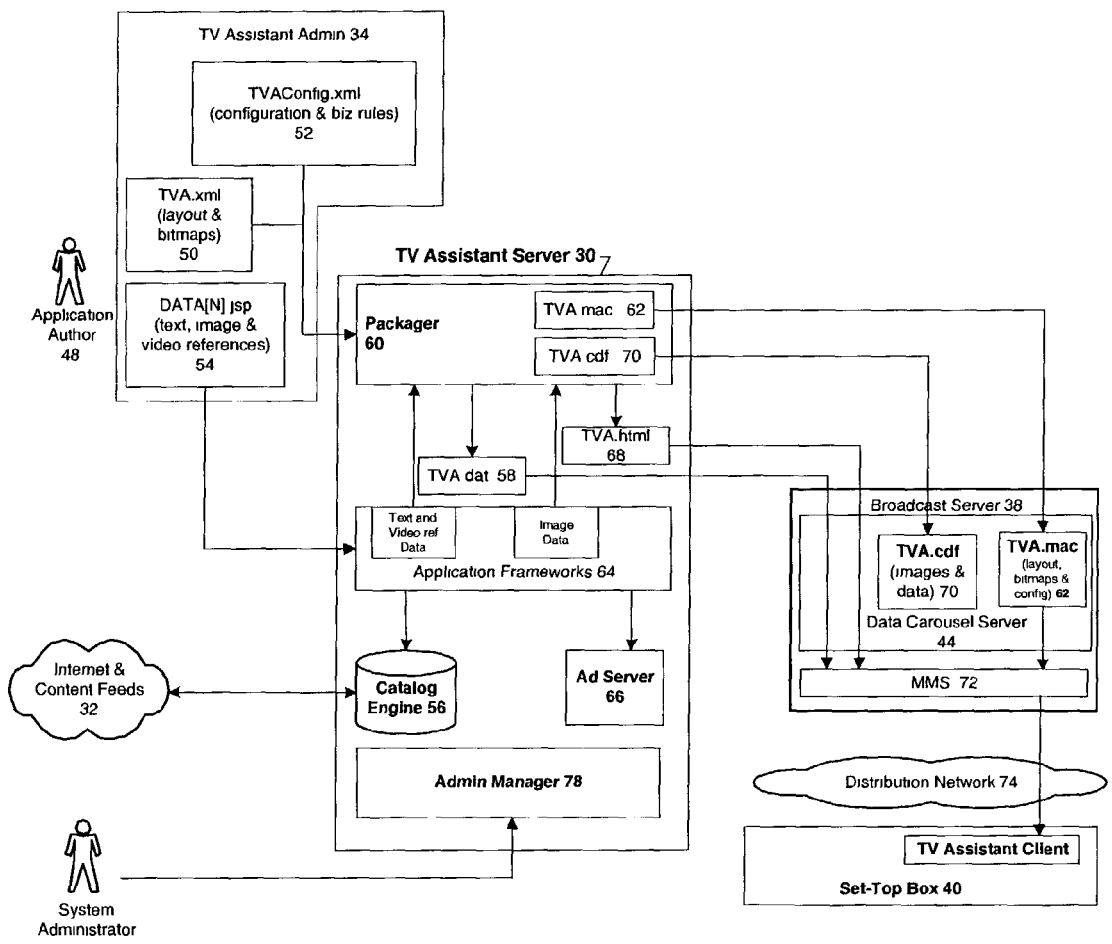
FIG. 3 illustrates another example of a content collection, distribution and display system having server and client components configured in accordance with an embodiment of the present invention.

As shown in FIG. 2, the TV Assistant application utilizes both a server-side component and a client-side component. The server-side component is responsible for delivering data on a scheduled basis. Data delivery mechanisms may include, but are not limited to, one or more of the following: Internet Protocol (IP) messages, such as through in-band or out-of-band data pathways, or though an IP gateway product; or in-band or out-of-band carousel data. Such data may also be encapsulated within MPEG2 packets for transmission through the in-band broadcast system. The server-side component provides data from multiple disparate sources using a TV Assistant server 30. The server 30 extracts, collects, integrates, and deploys content and commerce from a variety of sources 32 such as web servers, raw television feeds, data sources (such as file servers, etc.) into new rich television-centric services. It allows existing Internet brands, content, and commerce services to be introduced to a new audience of viewers. Content is dynamically harvested, re-purposed and enriched for the television without affecting the existing technology infrastructure or publishing resources of the content provider.

As shown, content from the various sources 32 is retrieved by the TV Assistant server 30 and formatted according to instructions provided via a configuration file TVAConfig.xml. This configuration file (which can specify "business rules" for content collection, update, etc.) is created by the network or content service provider using a TV Assistant Administrator component 34. In this example, the file is an extensible markup language (XML) file, however, any convenient programming language may be used. TVAConfig.xml is used to create the selected contents and the delivery location of the TVAContents.txt file (discussed below). It allows the operator of a given head-end, through a web interface or other command interface, to specify information regarding content such as location, syndication sources, number of items displayed per source, etc. It also allows the operator to indicate where the TVAContents.txt file 36 is to be deployed, including, where appropriate, the IP address of an Applet Verification Server (AVS) 42 in the head-end and associated attributes such as start/end time, interval, and refresh rate. An example of the TVAConfig.xml file is:

```
<TVA_ServletConfig>
    <City>
        <Name>San Francisco</Name>
        <State>CA</State>
        <Zip>94111</Zip>
        <WorldNews_Url> (insert local URL for world news) </WorldNews_Url>
        <LocalNews_Url> (insert local URL for local news) </LocalNews_Url>
        <Sports_Url> (insert local URL for sports) </Sports_Url>
        <Weather_Url> (insert local URL for weather) </Weather_Url>
        <WorldNews_Count>5</WorldNews_Count>
        <LocalNews_Count>10</LocalNews_Count>
        <Sports_Count>8</Sports_Count>
        <Weather_Count>3</Weather_Count>
        <AVS_IP> (insert IP address of applet verification server) <AVS_IP>
    </City>
</TVA_ServletConfig>
```

In one embodiment of the present invention, a server-side servlet named TVAGenerator.java resident at the TV Assistant server 30 is responsible for capturing content by harvesting data from the multiple data sources 32 via a syndication server (not shown in detail) as specified in the TVAConfig file. One example of a syndication server suitable for this purpose is described in detail in U.S. patent application Ser. No. 09/841,017, entitled "METHOD AND SYSTEM FOR TRANSFORMING CONTENT FOR EXECUTION ON MULTIPLE PLATFORMS", filed Apr. 23, 2001 and assigned to the assignee of the present invention, the complete disclosure of which is hereby incorporated by reference. In addition, the TVAGenerator file formats the captured contents into a data file, TVAContents.txt, 36 uploads TVAContents.txt to an appropriate broadcast file server (BFS) 38 (e.g., as specified in the TVAConfig file), by using a TVAFileUploader utility 46 to transfer the file through a verification system (if necessary) such as Liberate's AVS 42.

In this example, TVAFileUploader 46 is a Java utility that uses HTTP POSTs to upload the data file 36. This file uploader is executed each time the TVAContents.txt file is updated and generated. The file uploader reads the TVAContents.txt file 36 into a byte array and delivers it over TCP/IP to the broadcast file server 38.

TVAContents.txt is the data file 36 that contains the content to be displayed in the TV Assistant 10. This file gets generated on a schedule, typically every 30 minutes but this time period is configurable by the network operator, to acquire the latest data, and is stored in the local file system of the server 30 where TVAGenerator.java runs. The broadcast server 38 is responsible for delivering data file 36 (TVAContents.txt) to the client-side application using the selected delivery mechanism (e.g., TCP/IP over an existing signaling channel or via a data carousel channel, etc.). The TV Assistant server 30 thus creates a file (TVAContents) 36 for distribution to a set-top box 40 via a network operator's existing content delivery platform. In this example, the file 36 is a text file but this is a design choice that may vary depending upon the system configuration and implementation.

After receiving the data file 36, the set-top box 40 is responsible for reading the file contents and displaying the corresponding content in the manner described above. In the present example of the client—server architecture of the TV assistant application, the client application is programmed in Java (TVA.java) and is utilized in conjunction with a commercially available broadcast file server 38, e.g., the Liberate Compact platform, and a Motorola DCT2000 set-top box 40. Other systems configured in accordance with the present invention may be implemented using other languages such as C, C++, etc. on other set-top boxes 40 and/or TV middleware platforms 38.

The client-side component is an application that can be accessed in one of several ways depending on the set-top platform being used. For example, the client application (i.e., the actual client-side computer software) may be flashed onto the set-top box 40 as a stand-alone application or as an extension (or customization) of some set-top box resident application, or TV middleware system; or a broadcast application that is carouseled to the set-top box 40 over an in-band or out-of-band data channel from the broadcast server 38. Advantages of deploying the TV Assistant as a resident application or an extension/customization of a resident application of a set-top box 40 include:

a. Instant access via the MENU (or other) button on the remote control;
b. Accessibility over any broadcast TV channel;
c. No latency in load time as a result of being resident in the set-top box memory;
d. Ability to launch other services such as VOD, Walled Garden, Mail, Self-provisioning, etc.

The TVA.java file instantiates itself in the set-top box 40 and specifies the user interface menu's on-screen size and location. This allows the TV assistant 10 to position itself in a specific region of the TV screen, for example as specified by x-y coordinates. Upon receipt of the TVAContents.txt file 36, the TVA.java file reads the data contained in that file 36 to populate the TV Assistant 10. In some cases, this involves reading in the latest information from TVAContents.txt based on a schedule through a timer event. TVA.java formats the information and displays the content for each timer event. This may include examining sports score strings to determine game status and, if the game is final, displaying winning team/score in a different color. Refreshing of content is accomplished by periodically looking for new TVAContents.txt files transmitted by the data carousel server 44 associated with broadcast server 38. The TVA.java file also enables navigation to any selectable element in the TV Assistant 10 (including other applications such as VOD, etc.) and displays the following button states: unselected, selected, and selected/focus.

Figure 6:
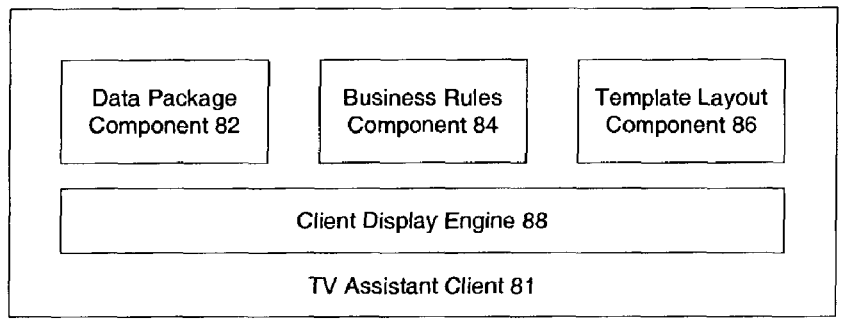
FIG. 6 illustrates an example of a client component of a TV Assistant configured in accordance with an embodiment of the present invention.

As shown in FIG. 6, the TV Assistant client component 81 itself includes four components (a data package component 82, a business rules component 84, a template layout component 86 and a client display engine 88), which cooperate to render the TV Assistant 10 as seen by the television viewer. That is, these four components accept, interpret and present the content delivered by the broadcast server 38 to the television viewer.

Figure 7:
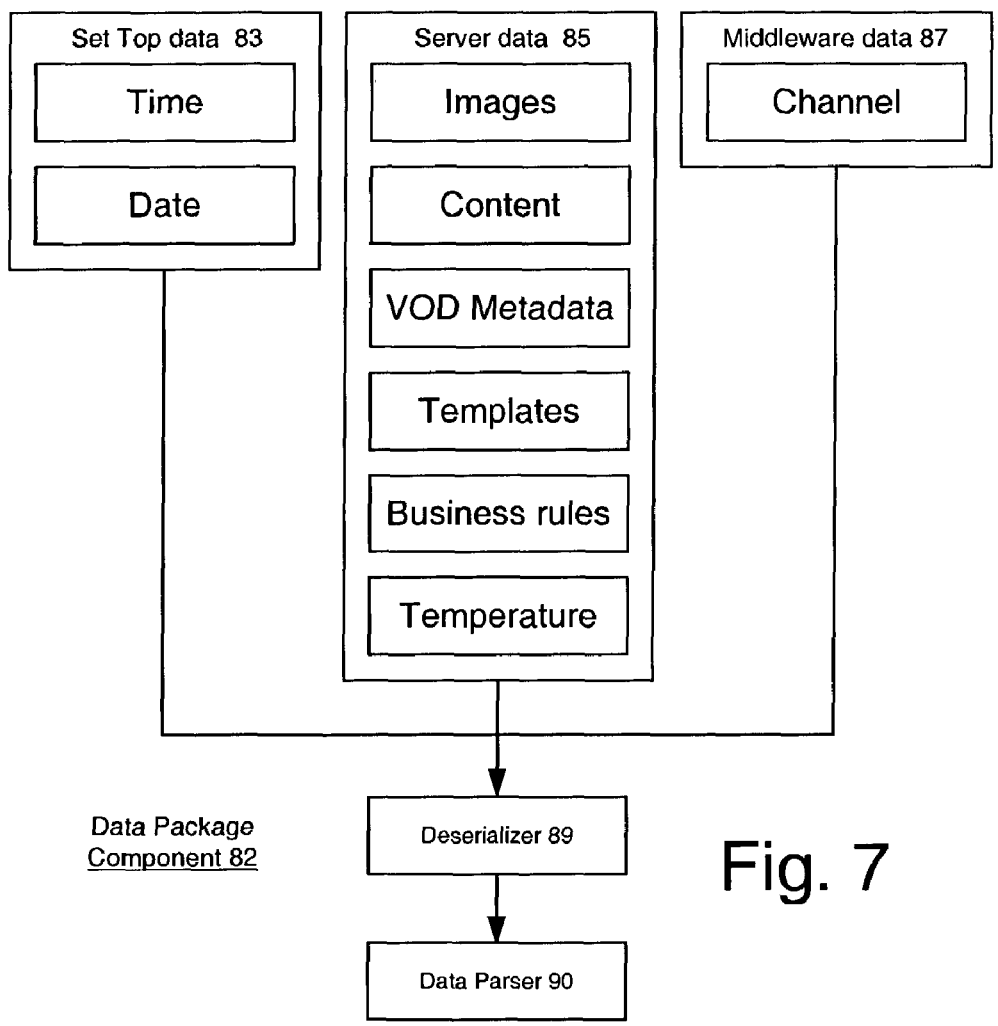
FIG. 7 illustrates an example of a client data package component of a TV Assistant client configured in accordance with an embodiment of the present invention.

The client data package component 82 is shown in detail in FIG. 7 and is responsible for receiving and parsing data elements and preparing them for display. The data package component 82 communicates with the distribution system to retrieve data packages (including set-top data 83, server data 85 and middleware data 87) as they are received, or as demanded by the client display engine 88. The data package component 82 includes a deserializer 89 and data parser 90, which together deserialize and interpret any optimized XML and binary data received from the server-side packaging component. Data package component 82 communicates with the client display engine 88 that creates and manages the data objects representing the data that is received in packages. Business rules metadata and template layouts are deserialized and reconstructed into objects for the business rules and template layout components 84 and 86, respectively. The data package component 82 communicates with the set-top box operating system interfaces to resolve references to set-top related data 83, such as time and date; and communicates with the resident middleware system to resolve references and requests for middleware data 87, such as current channel information. Other data (such as images, content for the ticker and content bar, VOD metadata and the like) is treated as server data 85 for the TV Assistant 10.

Figure 8:
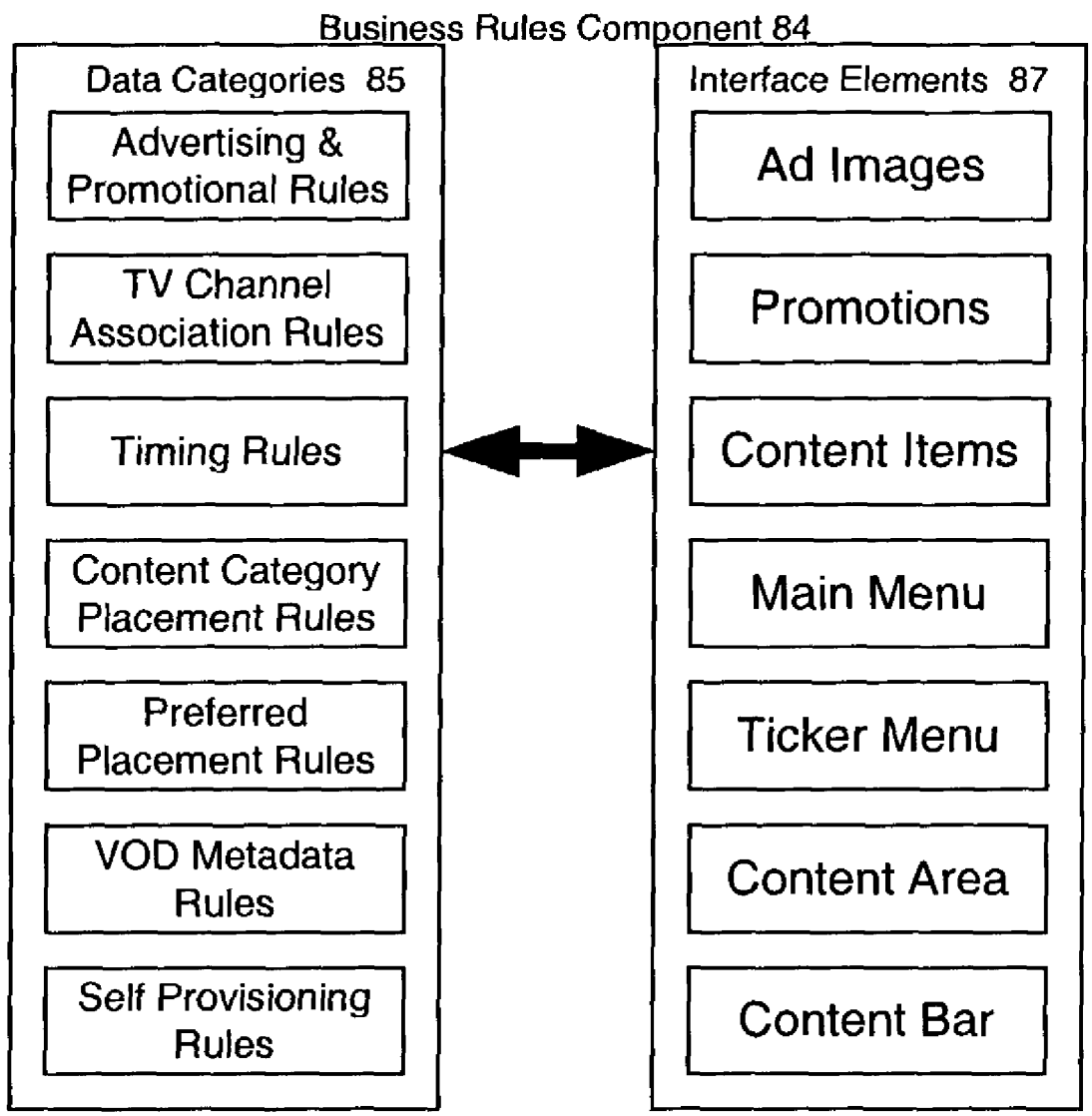
FIG. 8 illustrates an example of a business rules component TV Assistant client configured in accordance with an embodiment of the present invention.

The business rules component 84 is shown in detail in FIG. 8 and is responsible for constructing business rules objects and applying these business rules to template objects as directed by the template layout component 86. In one embodiment, business rules are described in XML format and define placement or other objectives that may be based on criteria such as: time of day, current channel, current broadcast content, viewer demographic, viewer behavior, navigation context and/or current content category.

As shown in the illustration, the business rules themselves may, in one embodiment, comprise rules associated with the following data categories 85:
  i. Advertising and Promotional rules
  ii. TV channel association rules
  iii. Timing rules (for rotation of content, ads and promotions)
  iv. Category placement rules
  v. Preferred placement rules
  vi. VOD metadata rules
  vii. Self provisioning rules The business rules component 84 receives the business rules data from the data package component 82, interprets them, and provides instructions that will eventually be applied to layout objects by the template layout component 86 and the client display engine 88. The business rules component 84 determines what interface elements 87 (data, images, ads, menu choices, etc.) are shown and when, and in what order and sequence those elements should be displayed. In one embodiment this may include displaying an advertisement for a sports product when the viewer is tuned to a sports channel. In another embodiment this may include providing links to a specific video when a user is on a specific channel at a specific time.

An example that illustrates the business rules metadata that is authored and/or generated by the server to control these display parameters is given below:

```
<?xml version="1.0" encoding="UTF-8"?>
<meta-business-rules>
    <ad-location-list start="1" end="9">
        <location id="1">
```

```
            <campaign id="1" start="1" end="4"/>
            <campaign id="11" start="5" end="7"/>
            <campaign id="1" start="8" end="9"/>
        </location>
        <location id="2">
            <campaign id="12" start="1" end="3"/>
            <campaign id="3" start="3" end="5"/>
            <campaign id="12" start="6" end="9"/>
        </location>
        <location id="3">
            <campaign id="5" start="1" end="3"/>
            <campaign id="15" start="4" end="7"/>
        </location>
    </ad-location-list>
    <ad-campaign-list start="1" end="9">
        <campaign id="1" displayrule="1">
            <ad id="1" adtype="1" href="String" src="String" displayruledata="1"/>
            <ad id="7" adtype="1" href="String" src="String" displayruledata="2"/>
            <ad id="4" adtype="1" href="String" src="String" displayruledata="3"/>
        </campaign>
        <campaign id="3" displayrule="2">
            <ad id="8" adtype="2" href="String" src="String" displayruledata="1"/>
            <ad id="2" adtype="2" href="String" src="String" displayruledata="2"/>
            <ad id="5" adtype="2" href="String" src="String" displayruledata="3"/>
        </campaign>
    </ad-campaign-list>
    <channel-association-list start="1" end="9">
        <content-type id="1">
            <channel id="3" start="1" end="4"/>
            <channel id="4" start="1" end="5"/>
            <channel id="11" start="3" end="9"/>
            <channel id="13" start="1" end="9"/>
        </content-type>
        <content-type id="2">
            <channel id="3" start="1" end="3"/>
            <channel id="5" start="2" end="9"/>
        </content-type>
    </channel-association-list>
    <link-association-list start="1" end="9">
        <content-link-type id="1">
            <channel-type id="3" start="1" end="4">
                <application id=21233 />
            </channel-type>
            <channel-type id="3" start="5" end="9">
                <application id=21244 />
            </channel-type>
            <channel-type id="4" start="1" end="9">
                <application id=21413 />
            </channel-type>
        </content-link-type>
        <content-link-type id="2">
            <channel-type id="3" start="1" end="3">
                <service id=11233 />
            </channel-type>
            <channel-type id="3" start="4" end="9">
                <service id=11222 />
            </channel-type>
            <channel-type id="7" start="3" end="9">
                <application id=21255 />
            </channel-type>
            <channel-type id="11" start="1" end="9">
                <service id=21215 />
            </channel-type>
        </content-link-type>
    </link-association-list>
    <content-rotation-list start="1" end="9">
        <content-type id="1">
            <channel-type id="2" start="1" end="9">
                <rotation displayrule="2" displayruledata="7" />
            </channel-type>
            <channel-type id="3" start="1" end="3">
                <rotation displayrule="1" displayruledata="5" />
            </channel-type>
            <channel-type id="3" start="4" end="7">
                <rotation displayrule="0" />
            </channel-type>
            <channel-type id="3" start="8" end="9">
                <rotation nodisplay="true" />
            </channel-type>
            <channel-type id="4" start="5" end="9">
                <rotation displayrule="1" displayruledata="5" />
            </channel-type>
            <channel-type id="0" start="1" end="9">
                <rotation displayrule="2" displayruledata="4" />
            </channel-type>
        </content-type>
        <content-type id="2">
            <channel-type id="2" start="1" end="9">
                <rotation displayrule="1" displayruledata="3" />
            </channel-type>
            <channel-type id="3" start="1" end="9">
                <rotation displayrule="1" displayruledata="5" />
            </channel-type>
        </content-type>
    </content-rotation-list>
    <preferred-placement-list start="1" end="9">
        <provider id="1233">
            <channel id="2" start="1" end="9">
                <placement displayrule="2" displayruledata="1" />
            </channel>
            <channel id="3" start="1" end="4">
                <placement displayrule="1" displayruledata="1" />
            </channel>
        </provider>
        <provider id="1453">
            <channel id="4" start="1" end="9">
                <placement displayrule="1" displayruledata="4" />
            </channel>
            <channel id="7" start="3" end="6">
                <placement displayrule="1" displayruledata="4" />
            </channel>
        </provider>
        <service id="3253">
            <channel id="4" start="1" end="9">
                <placement displayrule="2" displayruledata="4" />
            </channel>
        </service>
        <provider-type id="1">
            <channel-type id="2" start="1" end="9">
                <placement displayrule="3" displayruledata="4" />
            </channel-type>
            <channel-type id="3" start="1" end="3">
                <placement displayrule="2" displayruledata="2" />
            </channel-type>
            <channel-type id="1" start="1" end="9">
                <placement nodisplay="true" />
            </channel-type>
            <channel-type id="0" start="1" end="9">
                <placement displayrule="2" displayruledata="4" />
            </channel-type>
        </provider-type>
    </preferred-placement-list>
</meta-business-rules>
```

Figure 9:
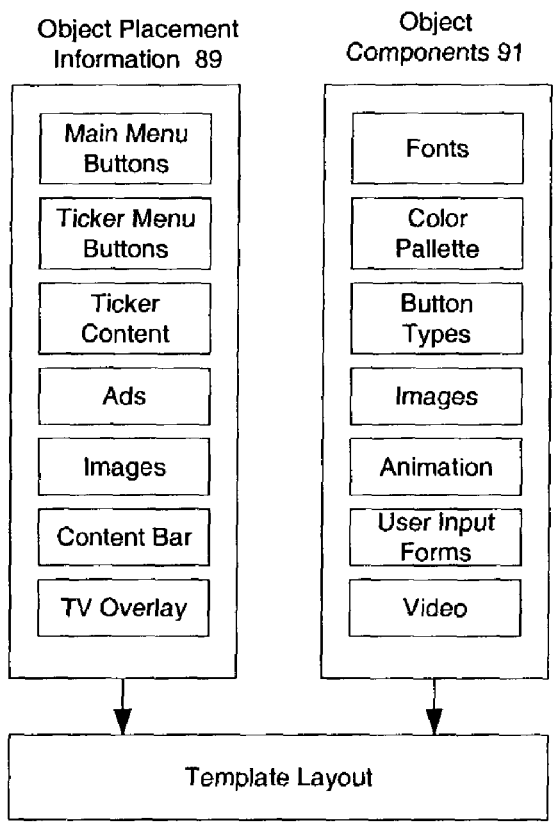
FIG. 9 illustrates an example of a template layout component of a TV Assistant client configured in accordance with an embodiment of the present invention.

The template layout component 86 is shown in detail in FIG. 9 and receives template definitions and data (content, ads, promotions, and VOD metadata) from the data package component 82, layout factors and rules from the business rules component 84 (which collectively are organized as content placement information 89 and object components 91) and prepares the interface for display by the client display engine 88. The template layout component 86 identifies all the aspects of the TV Assistant interface and orders them into a viewable user interface. It is responsible for creating a logical navigation structure for each screen, positioning of defined objects on a screen, and communicating information between objects and screen using the client display engine interfaces.

Figure 10:
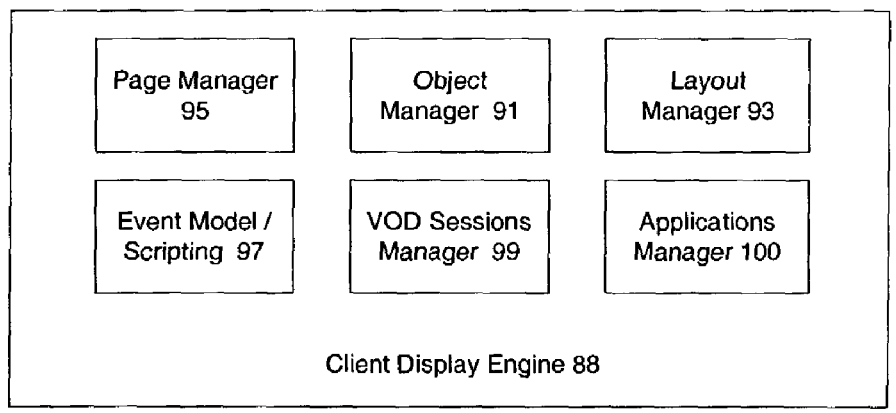
FIG. 10 illustrates an example of a client display engine of a TV Assistant client configured in accordance with an embodiment of the present invention.

The client display engine 88 is shown in detail in FIG. 10 and constructs and manages the objects (via object manager 91) that are used throughout the TV Assistant client 81. The client display engine 88 provides a set of interfaces for the other components of the client to manipulate these objects. It receives data and instructions from the data package component 82, the business rules component 84 and the template layout component 86 and generates the interface display on the set top box 40 for the viewer. The client display engine 88 manages the layout and navigation elements of the user interface via layout manager 93 and can provide links to other applications. It is responsible for monitoring user activity and generating the appropriate response. It includes a scripting and event model 97, which in one embodiment may be similar to Javascript, that provides a procedural language that a template author may use to program the display object model and business rules object model, and to respond programmatically to user events. It also includes a run-time cache object (page manager 95) that stores information about objects and pages and forthcoming pages for faster performance and reduced latency during page transitions. Other modules include a VOD sessions manager 99 and an application manager 100.

The client component, TVAjava, thus includes java classes and utilities for image manipulation, swapping, button functionality and text control. All of these assets along with all image assets, which in one embodiment are optimized through Liberate's VQ compression tool, are packaged into a file, TVA.jar, and either uploaded to the BFS 38 on a schedule or, ideally, flashed to the set-top box 40 a master application for best performance and ease of access.

In operation, the data file 36 (TVAContents.txt) is continuously broadcast to the set-top box 40 over either an in-band or out-of-band data channel. On the Liberate Compact platform, the data file 36 is delivered in an out-of-band channel in order for TV Assistant 10 to work over any analog or digital broadcast channel. A typical out-of-band channel provides approximate bandwidths of 2 Mb/sec downstream and 300K/sec upstream.

The size of the data file 36 is entirely dependent upon the amount of information that populates the TV Assistant 10. Below are a few potential scenarios:

Scenario 1 (approximately 3K file size)
  5 news headlines
  5 sports headlines/scores
  5 local headlines
  15 sports scores
  1 city weather forecast (3 day)
  5 promotional headlines
Scenario 2 (approximately 5K file size)
  10 news headlines
  10 sports headlines
  5 local headlines
  5 entertainment headlines
  20 sports scores
  20 stock quotes
  5 city weather forecast
  5 promotional headlines

Having thus described the individual components of the present content collection, distribution and display system, it is helpful to discuss an example of how this architecture is used. In the following example, specific details are provided for the creation, optimization, and automation of a TV Assistant specific to a platform configuration comprising Liberate's Compact 3.2.47 with MAC-J "Elmo" running on a Motorola DCT 2000 set-top box. These details are provided so that those of ordinary skill in the art can more fully appreciate certain implementations of the materials discussed above, however, this example should not be read as limiting the broader scope of the present invention to these implementation details.

Using authoring tools provided, for example, in the TV Assistant Administrator component 34, the application author 48 (e.g., an iTV network operator) generates the necessary layout and data templates for the TV Assistant application, and deploys them to the application server 30. The layout templates (TVA.xml) 50 may be bundled with any bitmap images used for buttons, user interface controls, etc. This allows the network operator to customize the look and feel of the TV Assistant 10 as it will ultimately be displayed to the television viewer.

The business rules and configuration data file (TVAConfig.xml) are also authored and specify the rules for organizing and placing content, promotions and advertising within the TV Assistant. In this example, dynamic data generation templates (used to generate dynamic text data, image and video references) are created as Java Server Pages (DATA[N].jsp) 54 that conform to the Application Frameworks XML language developed by the assignee of the present invention, which provides a set of executable tags to access dynamic data harvested by a catalog engine 56. When executed, these templates 54 create a set of named data packages (TVA.dat) 58. Further details regarding this process may be found in the above-cited U.S. patent application Ser. No. 09/841,017.

The TVA.xml file 50 is run through a packager component 60 of the TV Assistant server 30, which uses extensible stylesheet language transformations (XSLT) to transform the XML information to a highly optimized, binary XML format file (TVA.mac) 62. These templates reference the contents of data packages via predetermined hierarchical package name references. The packager 60 then transports the TVA.mac file 62 directly to the Liberate broadcast server 38, where the Liberate Mediacast server 44 carousels TVA.mac to the set-top box 40 via an in-band channel. This process only needs to occur once, or as often as the application designer wishes to make changes to the layout and application behavior.

With data templates already residing on the TV Assistant server 30, processes need to occur to execute and create the dynamic data packages with their text data, image and video reference information. This process is initiated by specifying the data generation business rules within the TV Assistant Admin component 34 for scheduling data packages. In some cases, this may be done through a web-type interface (Admin Manager) 78 associated with server 30. According to the specified schedules, the packager 60 will initiate execution of the data templates (DATA[N].jsp) 54 via an Application Frameworks component 64 of server 30.

The DATA[N].jsp pages are broken into separate file types: those containing text data, including video url references, and those containing the image assets related to that data (backgrounds, photos, ads, etc.). When the DATA[N].jsp files are executed by the Application Frameworks component 64, the latest text, video references and image data are retrieved from the catalog engine 56. Independently, the catalog engine 56 is configured to harvest, process and store related data and metadata from content feeds 32, asset distribution interface (ADI) packages, and/or the Internet. If desired, an advertising server 66 may be invoked to resolve any advertising and/or promotion resources that are being provisioned for the given period as configured by the TV Assistant Admin 34. Dynamic business rules defined by the network service provider to be applied by the TV Assistant application client are retrieved and packaged with the data.

The DATA[N].jsp pages are processed by the Application Frameworks component 64 and the dynamic data sets returned to the packager 60. The packager transforms the text video reference portion of the data into a binary format file (TVA.dat) 66. The packager then generates TVA.html files 68 for the image portion of the data, and these files refer back to the image data. Finally, the packager generates an TVA.cdf file 70 containing references to the TVA.dat and TVA.html files 58 and 60 and posts this to the data carousel (DC) server 44.

The DC server 44 parses the TVA.cdf file 70 and downloads all the necessary data files referenced therein. It will also render the images referenced by the TVA.html files 68 into MPEG I-Frames and P-Frames, as required. The DC server 44 creates objects in Mediacast Signaling Protocol (MSP—a protocol for data broadcasting to set top boxes that allows any number of clients to access a carousel without increasing the downstream bandwidth required) format and sends them to the multimedia streamer (MMS) component 72 of broadcast server 38 for transport to set-top box 40 via the distribution network 74. At this point the necessary data and transport stream files will be spinning continuously on the carousel over an in-band channel. Additionally, the application client, which provides the execution platform and APIs used to implement the TV Assistant application, could itself be included in this carousel if it has not already been flashed onto the set-top box 40.

A system administrator for the network service provider can access the Admin Manager web interface 78 for the TV Assistant server 30 at any time to complete a number of tasks, including the ability to: modify configurations for the TV Assistant application, modify advertising and promotion campaign settings, change ticker settings, change business rules settings, change content harvesting sources, specify schedules and business rules for creating data packages, and a host of other activities.

Figure 4A:
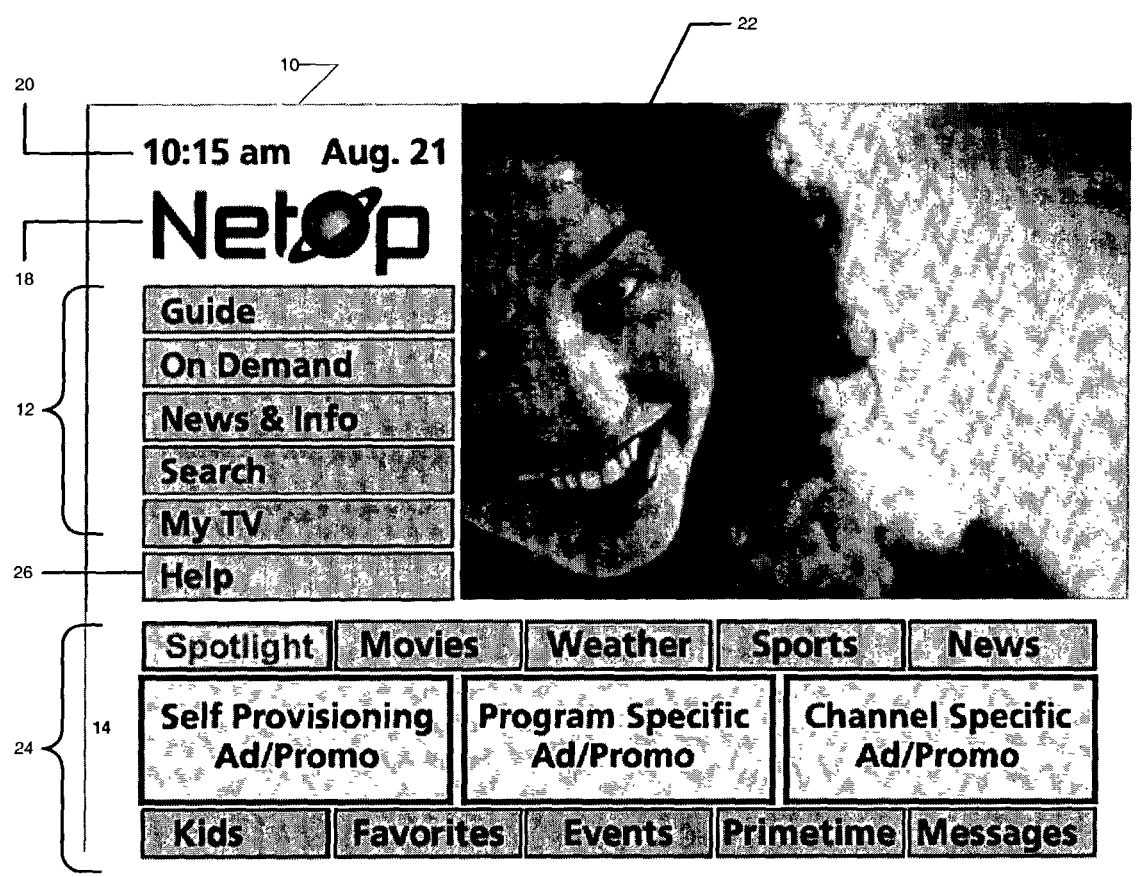
FIG. 4A illustrates a further example of an on-screen menu portion of a user interface for iTV services configured in accordance with an embodiment of the present invention in which a menu overlay is used.

Having examined the content collection and distribution architecture, some further examples of the on-screen menu portion of the present user interface may be described. As indicated above, the TV Assistant may be displayed as an overlay menu simultaneously with television video. FIG. 4A provides an example of such a display. In this example, the TV Assistant 10 is displayed over regular television program video 22, but that video is still viewable. Components of the TV Assistant 10 have been organized in a different fashion than was the case in FIG. 1, for example the content bar 20 now appears at the upper left of TV Assistant 10 and the number and types of main menu 12 categories and ticker categories 24 have changed, but the functionality provided by TV assistant 10 has not changed.

Figure 4B:
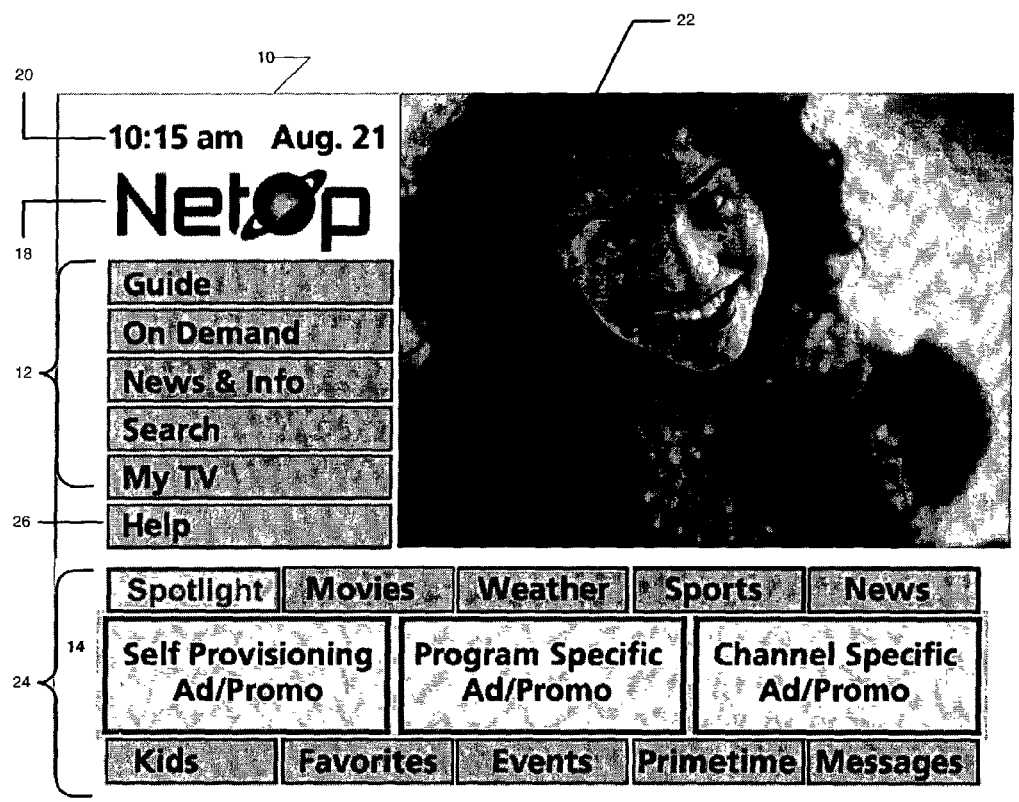
FIG. 4B illustrates a further example of an on-screen menu portion of a user interface for iTV services configured in accordance with an embodiment of the present invention in which scaled television video is used.

Referring now to FIG. 4B, the same features, functionality and layout for TV Assistant 10 are presented as was the case for the FIG. 4A embodiment, with the exception that the television video 22 is now displayed in a scaled fashion. That is, the television video 22 is displayed in a window framed by TV Assistant 22, but the image so displayed is a scaled representation of what would otherwise occupy the entire television screen if the TV Assistant 10 were not displayed. Such image scaling may be accomplished using conventional picture-in-picture or split screen image presentation technology as exists in many television receives and/or set-top box units.

Figure 4C:
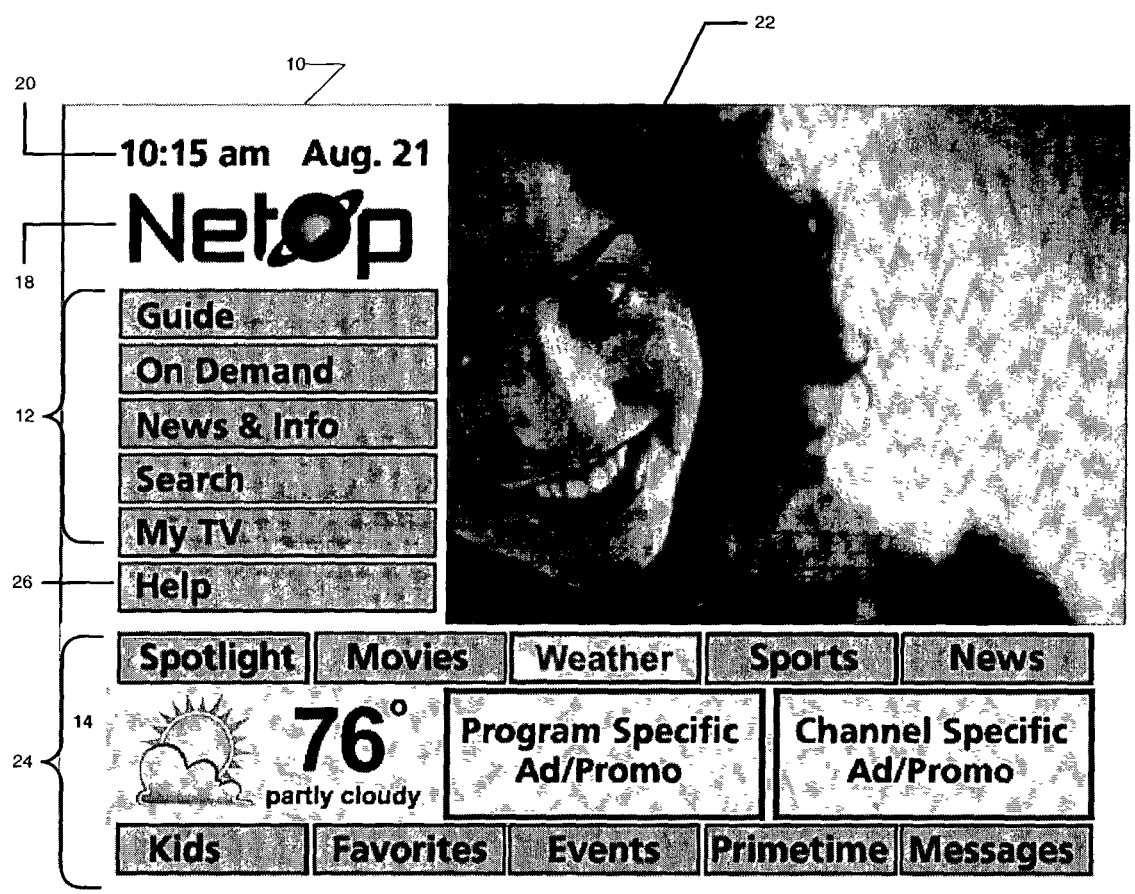
FIG. 4C illustrates yet another example of an on-screen menu portion of a user interface for iTV services configured in accordance with an embodiment of the present invention in which ticker state has changed from that shown in FIG. 4A.

FIG. 4C illustrates an example of TV Assistant 10 when the ticker state has changed. Compare the illustration set forth in FIG. 4A to that in FIG. 4C. Notice that the ticker state has changed from "Spotlight" to "Weather" and the corresponding content in content area 14 has changed to reflect current weather conditions. This is one example of how content is rotated within the content area 14. The ticker menu 24 now has the "Weather" menu highlighted to reflect the ticker state, as described above. Similar state changes could be reflected if the scaled television video representation was used.

Earlier it was noted that the TV Assistant provided a mechanism for broadcast partner integration that is context sensitive to the broadcast channel to which the television is tuned. That is, the TV Assistant may be populated by content that is specific to the currently tuned broadcast TV channel. An example of such functionality is shown in FIGS. 5A and 5B.

Figure 5A:
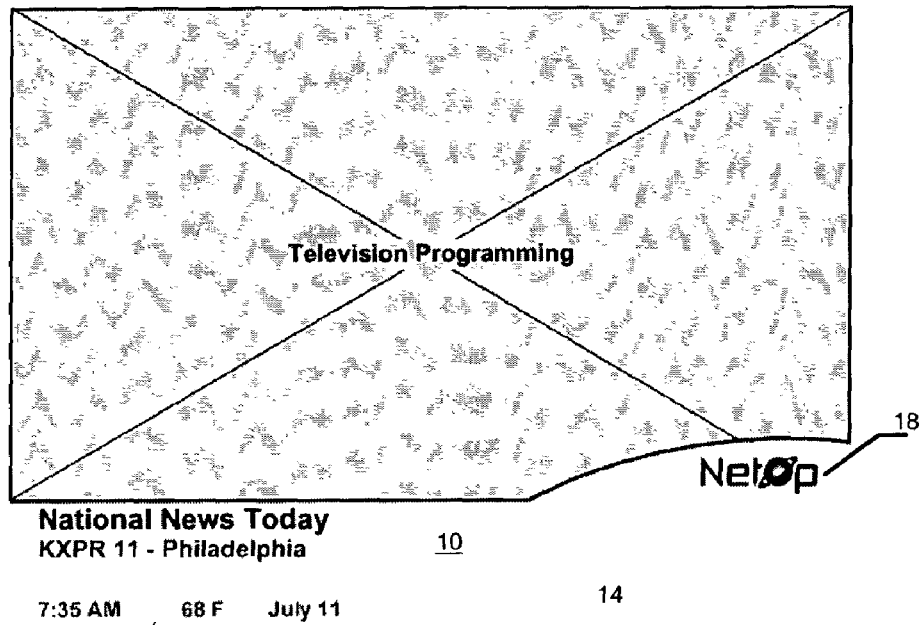
FIGS. 5A and 5B illustrate an example of a TV Assistant configured in accordance with an embodiment of the present invention, and which becomes populated by content that is specific to a currently tuned broadcast TV channel.

FIG. 5A illustrates an example of the TV Assistant 10, this time shown without any television video. This example illustrates one configuration of TV Assistant 10 as might be displayed in connection with a television channel for which there is no corresponding context sensitive information which the broadcaster or network operator wishes to provide access. In other words, the TV Assistant 10 is displayed in a basic form as an informational overly with basic information about the current channel (e.g., channel number, broadcaster call letters, etc.) and the lower content bar 20.

Figure 5B:
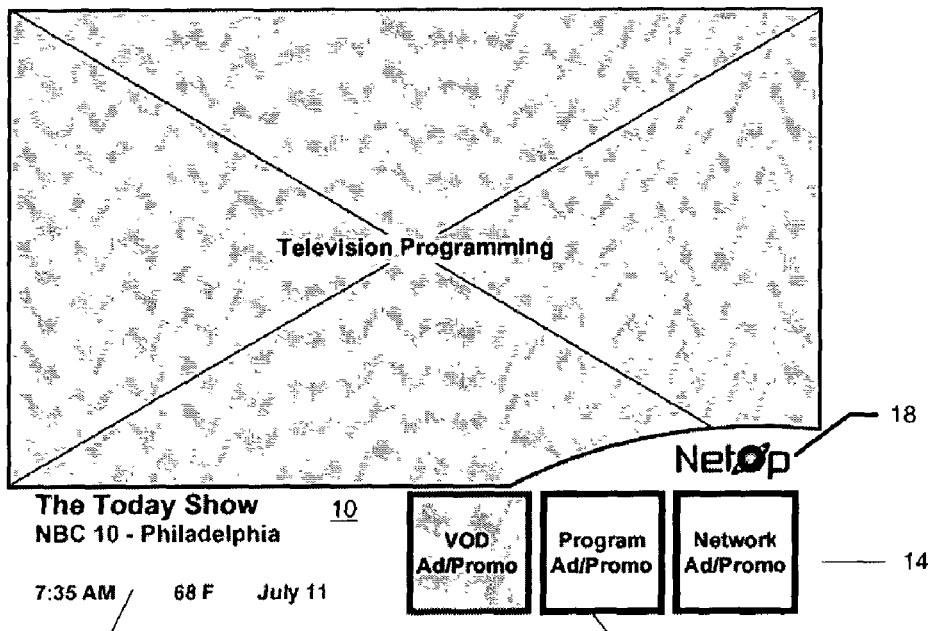

When the viewer changes channels to a channel for which there is context sensitive information which the broadcaster or network operator wishes to provide access to, however, the content displayed within TV Assistant 10 changes, as shown in FIG. 5B. In this example, a more advanced interface is presented with broadcaster specific content displayed in the content area 14. For example, news and weather interactive content services may be made available to the viewer via the TV Assistant user interface. Rather than being presented as text highlights as in the previous examples, in this case such interactive content is signaled using graphical elements such as tiles 80, which can be selected by a viewer using a remote control similar to the way in which one might use a computer's cursor control device to select a hyperlink displayed in a web browser. In this way, the TV Assistant user interface may extend the television broadcast content by presenting an interactive content area that includes time or context sensitive messages or other items (e.g., in the form of a tiled grid or as textual references) based on business rules such as time of day, channel selected, and so on. This presents viewers with additional opportunities to select on-demand content supplemental to the broadcast or promoted by the broadcaster, programmer, advertiser or network operator.

Thus, an interactive user interface for television applications has been described. Content for display through the TV Assistant application is retrieved and packaged for delivery using the TV Assistant server 30. The data package is delivered via various protocols including TCP/IP or out-of-band broadcast to populate the content area 14 of the on-screen menu. Selecting any sub category, e.g., News, Sports, Weather, of main menu 12 changes the displayed content to that topic. Selecting the "GO" button 16 drives the user to the related page in the walled garden for more information on that particular headline/item.

What is claimed is:
1. A system, comprising:
   a first server configured to
      harvest data from multiple data sources according to collection rules specified in a configuration file that identifies locations from which the data is harvested, wherein the multiple data sources includes one or more web servers and one or more file servers, wherein the collection rules were created by a content service provider, and
      format the data that was harvested from the multiple data sources into a data file;

a second server configured to receive the data file and transmit the data file to a client device utilizing a transmission channel; and the client device configured to receive the data file via the transmission channel and populate a user interface with the data that was harvested from the multiple data sources subject to business rules.

2. The system of claim 1, wherein the user interface includes:

a menu area that is configured to provide access to a variety of services into which the data that was harvested from the multiple data sources is categorized; and a content display area in which portions of the data that was harvested from the multiple data sources are displayed, wherein the portions are associated with a selected menu service.

3. The system of claim 2, wherein content otherwise not associated with the selected menu service is configured to be displayed in the content display area.

4. The system of claim 3, wherein one or more individual content items configured to be displayed in the content display area of the user interface comprise at least one of an advertisement or a promotion.

5. The system of claim 4, wherein at least one of the individual content items is linked to an application other than the content display area.

6. The system of claim 5, wherein the at least one advertisement or promotion is configured to be displayed prior to a linked application being executed.

7. The system of claim 4, wherein the at least one advertisement or promotion are configured to be displayed in the content display area after all individual content items of a selected menu service have been displayed and before other individual content items of another menu service are displayed.

8. The system of claim 4, wherein one or more of the advertisements are linked to a service within an interactive television service.

9. The system of claim 4, wherein one or more of promotions are linked to an interactive capability to self-provision a service related to the one or more promotions.

10. The system of claim 2, wherein the portions are configured to be displayed in the content display area of the user interface in a rotating fashion such that individual content items are displayed for configurable periods of time and then automatically replaced with new content items.

11. The system of claim 2, wherein the variety of services include one or more of: video on demand services, game services, television programming related content services, managed content services, special interest services, self-provisioning services, chat services, email services, or television programming guide services.

12. The system of claim 11, wherein displayed categories and services are configured to change dynamically as new services are introduced and new business rules are defined by a network operator.

13. The system of claim 2, wherein the user interface further includes a content user interface that is configured to display designated content regardless of what information is displayed in the content display area.

14. The system of claim 13, wherein the designated content comprises date, time, temperature, channel, and program information.

15. The system of claim 2, wherein the services are navigable via a control path associated with the client device.

16. The system of claim 15, wherein the client device comprises a set-top box unit and the control path comprises a remote control unit for the set-top box unit.

17. The system of claim 1, wherein the data that was harvested from the multiple data sources is displayable via the user interface in both a passive mode, in which the data that was harvested from the multiple data sources is displayed in a sequence independent of any selection operations, and an active mode, in which the data that was harvested from the multiple data sources is displayed in a sequence that depends on selection operations.

18. The system of claim 1, wherein the data that was harvested from the multiple data sources is displayable via the user interface according to categories.

19. The system of claim 18, wherein the categories include one or more of: news, weather, sports, entertainment, money/finance, travel, special interest, demographic, world, national, regional, or local information.

20. The system of claim 18, wherein the data that was harvested from the multiple data sources is displayable as individual content items within each of the categories for a configurable period of time on a rotating basis.

21. The system of claim 20, wherein each individual content item within a particular category is configured to be displayed prior to display of content items within other categories.

22. The system of claim 21, wherein interstitial advertising or promotional content items are displayed between content items of different categories.

23. A method, comprising:

causing a display of (i) an interactive menu through which content items that are organized into a plurality of categories are displayed in ticker fashion and interactive services are accessed, the ticker fashion including a passive mode, in which first content items of a first category in the plurality of categories are displayed in a time-rotating sequence independent of any selection operations by a viewer and followed by display of second content items of a second category in the plurality of categories, and an active mode, in which one or more of the content items of a particular category in the plurality of categories are displayed in a different time-rotating sequence that depends on selection operations by the viewer, and (ii) programming.

24. A method as in claim 23, wherein the programming is displayed in a scaled or overlay format.

25. A method as in claim 23, wherein all content items of the first category are displayed before content items of the second category.

26. A method as in claim 23, wherein each category is selectable by the viewer.

27. A method as in claim 26, wherein the plurality of categories include one or more of: news, weather, sports, entertainment, money/finance, travel, special interest, demographic, world, national, regional, or local information.

28. A method as in claim 23, wherein at least one advertisement or promotion is displayed after all of the first content items have been displayed and before display of the second content items.

29. A method as in claim 23, wherein at least one of an interstitial advertising or promotional content item is displayed between content items of different categories.

30. A method as in claim 23, wherein at least one of the content items is linked to applications.

31. A method as in claim 30, wherein at least one of an interstitial advertisement or an interstitial promotional content item is displayed prior to the linked applications being executed.

32. A method as in claim 23, wherein the interactive services include one or more of: video on demand services, game services, television programming related content services, managed content services, special interest services, self-provisioning services, chat services, email services, or television programming guide services.

33. A method as in claim 32, wherein the interactive menu further displays date, time, temperature, channel and program information.

34. A method as in claim 23, wherein the content items are periodically updated.

35. An apparatus comprising:
a terminal configured to:
cause a simultaneous display of (i) an interactive menu through which content items that are organized into a plurality of categories are displayed in ticker fashion and interactive services are accessed, the ticker fashion including a passive mode, in which first content items of a first category in the plurality of categories are displayed in a time-rotating sequence independent of any selection operations by a viewer and followed by display of second content items of a second category in the plurality of categories, and an active mode, in which one or more of the content items of a particular category in the plurality of categories are displayed in a different time-rotating sequence that depends on selection operations by the viewer, and (ii) programming.

36. The apparatus of claim 35, wherein at least one advertisement or promotion is displayed after all of the first content items have been displayed and before display of the second content items.

37. The method of claim 23, wherein a background color of a navigation button changes automatically in response to a category change in the passive mode.

38. The apparatus of claim 35, wherein a navigation button is complemented with a graphic icon to indicate that the active mode is selected.

* * * * *